3,340,092
COMPOSITE PACKAGING SHEET
Augustus E. Craver and Joseph C. Mohan, Fredericksburg, Va., and John L. Justice, Wallingford, Pa., assignors to FMC Corporation, Philadelphia, Pa., a corporation of Delaware
No Drawing. Filed Nov. 20, 1963, Ser. No. 325,135
5 Claims. (Cl. 117—145)

ABSTRACT OF THE DISCLOSURE

A composite packaging sheet material which comprises a hydrophilic polysaccharide base sheet having a smooth, non-particulate coating uniformly covering the base sheet. The coating material is a homogeneous blend of a conventional saran resin, e.g. a copolymer of 80–94% vinylidene chloride and 20–6% of acrylonitrile; and a copolymer of 78–90% vinylidene chloride and 22–10% of a $C_8$–$C_{16}$ alkyl acrylate or methacrylate or mixtures thereof.

---

In the past several years, polysaccharide sheets and particularly cellulosic films coated with vinylidene chloride resin to moistureproof the same have come into relatively extensive use. It has been discovered heretofore that hydrophilic films and sheets can be effectively moistureproofed with a vinylidence chloride resin coating wherein the vinylidene chloride content of the resin is at least about 80% by weight of the resin, and more particularly wherein the vinylidene chloride content of the resin coating constitutes approximately 90% by weight of the resin.

Although such a resin coating is admirably suited to moistureproofing, it is not without disadvantages. One of the major drawbacks of a hydrophilic film coated with a resin containing approximately 90% by weight vinylidene chloride resides in the initial temperature at which a heat seal may be effected. In other words, the temperature at which such a coated film will heat seal is too low. Consequently, if sheets coated with this resin are stacked one upon another, or if large rolls of the same are fabricated, they tend to laminate or block very badly. This effect is frequently observed with equipment involving the application of heat. Thus in the well known Simplex bag machine, a coated sheet is folded and laminated along its peripheral edges in order to form a bag. Frequently, however, because of the low initial heat seal temperature of such a resin coated film, the heat generated by the Simplex machine causes laminations of sheets and bags at locations wherein laminations are undesirable. At the same time, the heat seals are dry, brittle and tight. Consequently, the phenomenon known as "V-tearing" occurs with the packaging film at intervals considerably more frequent than can be tolerated.

In the past, the problem of blocking and poor slip has been partially alleviated for example, by powdering the surface of the coated sheet or by incorporating compartively large resin particles in the coating to produce a somewhat bumpy surface which tended to improve the blocking characteristics of the sheets, but which produced sheets which were more easily scratched to produce haze and reduce clarity.

An even greater problem exists with regenerated cellulose film coated with vinylidene chloride resins of this type. As is well known, regenerated cellulose film (i.e., cellophane) depends to large extent on absorbed moisture for its flexibility and plasticity.

In the lacquer method of applying a conventional moistureproofing coating, such as a nitrocellulose composition, to a cellulosic film, after application of the coating solution the coated film is generally run through a drying and humidifying apparatus. The first section of the apparatus is the solvent removal section wherein the lacquered film is heated to drive off the solvent by flash evaporation. However, since the organic solvent forms an azeotrope with the absorbed water in the cellulosic film resulting in a substantial loss of water therefrom, it has been conventional practice in the prior art to follow this solvent removal step with a humidifying step in order to bring the moisture content of the dried coated film back up to the desired level.

Such a solvent removal and humidifying method has been successfully utilized for many years with nitrocellulose coated film. However, it was found that this conventional procedure for humidifying the dried coated film was very inadequaate wherein a cellulosic film is coated with a resin containing at least 80% by weight vinylidene chloride (usually 90%). Whereas the usual operation of the apparatus utilized permits running the cellulosic film coated with nitrocellulose through the solvent removal section and humidifier section at a speed of approximately 300 feet per minute (or a dwell time of approximately 8 seconds in the 40 ft. long humidifier) to produce a film having the desired moisture content, such operation proved to be entirely impracticable with a cellulosic film coated with a resin containing at least 80% by weight vinylidene chloride, since the resulting film would contain too little moisture.

In terms of dwell time alone, it took about three times as long to dry and humidify a film coated with a resin containing approximately 90% vinylidene chloride as had been needed heretofore with other moistureproof coatings such as nitrocellulose, and twice as many drying and humidifying apparatuses had to be used. Still further, both time and film were lost in lacing the second apparatus.

The present invention not only overcomes one or several of these problems; unexpectedly, it overcomes all of them.

Accordingly, it is an object of this invention to provide a hydrophilic polysaccharide sheet coated with a moistureproofing blend of vinylidene chloride polymers having an over-all vinylidene chloride content of at least about 80, preferably about 90%, which is readily heat-sealable and has high clarity and improved blocking characteristics.

It is a further object of this invention to provide a cellulosic film having a blended resin coating as described hereinabove which exhibits a tougher, more flexible, gummier seal when heat sealed.

It is still a further object of the present invention to provide a cellulosic film having a blended resin coating as hereinabove described which, in a lacquer coating operation, can be dried and humidified at speeds substantially in excess of those known heretofore wherein the coating contains approximately the same vinylidene chloride content.

Another object of this invention is to provide a clear, composite sheet of regenerate cellulose film coated with a smooth, comparatively even layer of a blend of saran resins which has excellent moistureproofness and improved blocking characteristics.

These objects and others which will appear to those skilled in the art in the description that is set out below are provided by applicants' discovery of a novel two component blend of vinylidene chloride-containing polymers. This blend of vinylidene chloride-containing polymers is one consisting essentially of (a) approximately 50 to 95% by weight of a polymer containing 80 to 94% by weight of vinylidene chloride and 20 to 6% of either acrylonitrile, a $C_1$–$C_6$ alkyl acrylate or methacrylate, acrylic acid, or methacrylic acid, and (b) approximately 50 to 5% by weight of a polymer containing 78 to 90% by weight vinylidene chloride and 22 to 10% by weight of either a $C_8$–$C_{16}$ alkyl acrylate, $C_8$–$C_{16}$ alkyl methacrylate or mixtures thereof.

The moistureproofness of the resin coating depends to a large extent on a high vinylidene chloride content; on the other hand, resins having a high vinylidene chloride content are more difficulty dissolved in conventional organic solvents than are those containing lesser amounts thereof. Accordingly, more practicable working conditions dictate a preference for a blend consisting essentially of (a) approximately 83 to 92% by weight of a polymer containing 85 to 92% by weight of vinylidene chloride and 15 to 8% by weight of either acrylonitrile, a $C_1$–$C_6$ alkyl acrylate or methacrylate, acrylic acid, or methacrylic acid, and (b) approximately 17 to 8% by weight of a polymer containing 80 to 90% by weight of vinylidene chloride and 20 to 10% by weight of either $C_8$–$C_{16}$ alkyl acrylate, $C_8$–$C_{16}$ alkyl methacrylate or mixtures thereof.

Examples of lower molecular weight alkyl acrylates and methacrylates of one vinylidene chloride copolymer blend component include methyl acrylate and methacrylate, ethyl acrylate and methacrylate, propyl acrylate and methacrylate, isopropyl acrylate and methacrylate, butyl acrylate and methacrylate, isobutyl acrylate and methacrylate, amyl acrylate and methacrylate, isoamyl acrylate and methacrylate, and hexylacrylate and methacrylate.

Examples of the higher alkyl acrylates and methacrylates used for the other vinyidene chloride copolymer blend component include octyl acrylate and methacrylate, 2-ethylhexyl acrylate and methacrylate, nonyl acrylate and methacrylate, decyl acrylate and methacrylate, undecyl acrylate and methacrylate, dodecyl acrylate and methacrylate, tridecyl acrylate and methacrylate, tetradecyl acrylate and methacrylate, pentadecyl acrylate and methacrylate, and hexadecyl acrylate and methacrylate. One preferred embodiment of this invention employs a mixture of octyl and decyl methacrylates as the minor monomer components of the copolymer. This preference is dictated by the commercial availability of this mixture and the excellent results obtained therewith.

Hydrophilic polysaccharide sheets of this invention include, for example, xylan films, amylose films, cellulose derivative films such as cellulose ethers and esters and regenerated cellulose films. Regenerated cellulose is preferred based on availability and expense.

The resin blends of this invention are conventionally applied to the base sheet by first dissolving the resins in an organic solvent. After evaporation of the carrier the deposited coating is a smooth continuous layer which substantially reduces moisture vapor transmission through the composite sheet and, surprisingly, provides improved blocking characteristics compared to straight saran coatings. Smooth coatings of the blended resins may also be applied by first blending latexes of the two resins. These latex blends contain extremely small resin particles usually less than 1 micron in diameter, which melt together to provide a smooth coating after the water in the system has been boiled off and additional heat is supplied to cause coalescence. In any event, the composite sheet of this invention is formed so that the coating is smooth, continuous and non-particulate, yet provides improved blocking characteristics under the conditions to which it is exposed in automatic packaging operations without degrading other properties of the sheet. When employing regenerated cellulose film as the base sheet the composite sheet of this invention exhibits essentially the same drying and rehumidifying characteristics as have been heretofore associated with nitrocellulose coated regenerated cellulose films.

The following examples are set forth to demonstrate the composite sheets of this invention and some of their excellent properties.

Example I

A sheet of 300 gauge regenerated cellulose film (i.e., weighing about 30 g./square meter) containing as an anchoring agent about 0.15% by weight of a partially polymerized precondensate of melamine and formaldehyde was coated with a moistureproofing coating having the following constitution in parts by weight:

| | |
|---|---|
| Resin A [1] | 90.00 |
| Resin B [2] | 10.00 |
| Paraffin | 1.70 |
| Hydrogenated castor oil | 1.00 |
| Clay | 1.40 |
| Alkyd resin [3] | 0.25 |
| Microcrystalline hydrocarbon wax | 0.25 |

[1] Resin A—Copolymer consisting of 90% by weight of vinylidene chloride and 10% by weight of acrylonitrile.
[2] Resin B—Copolymer consisting of 85% by weight of vinylidene chloride, about 6.0% by weight of decyl methacrylate, about 8.25 to 9.0% by weight of octyl methacrylate and about 0 to 0.75% by weight of hexyl methacrylate.
[3] Alkyd resin—Castor oil phthalate-adipic acid-diethylene glycol copolyester—used as release agent.

Solvent—65% by weight tetrahydrofuran and 35% by weight toluene.
Initial solids—15.5% by weight.
Average solids—17.5% by weight (increased due to solvent loss).
Coater and drier speed—300 feet/minute.
Drier temperature—240° F.
Humidifier temperature, dry bulb/wet bulb—210°/200° F.
Coating weight—about 4.5 g./square meter.
Haze—4%.
Moisture vapor transmission ratio—18 to 20 g./square meter.
Moisture content—about 6% by weight.
Initial sealing temperature—210° F.
Coated film is essentially free of V-tears and blocking.

Example II

The procedure of Example I was repeated using the same materials in the same quantities except that the gauge of the regenerated cellulose film was 450 rather than 300 (thus it weighed about 45 grams per square meter rather than 30 grams per square meter).

Example III

The procedure of Example I was repeated utilizing the same materials in the same quantities except that 80 parts by weight of Resin A of Example I were utilized and 20 parts by weight of Resin B of Example I were utilized.

Example IV

The procedure of Example I was repeated utilizing the same materials in the same quantities except that 85 parts by weight of Resin A of Example I were utilized and 15 parts by weight of Resin B of Example I were utilized.

Example V

The procedure of Example I was repeated utilizing the same materials in the same quantities except that Resin B constituted a copolymer consisting of 80% by weight of vinylidene chloride, about 8.0% by weight of decyl methacrylate, about 11.0 to 12.0% by weight of octyl methacrylate and about 0 to 1.0% by weight of hexyl methacrylate.

Example VI

The procedure of Example V was repeated utilizing the same materials in the same quantities except that 80 parts by weight of Resin A were utilized and 20 parts by weight of Resin B of Example V were utilized.

Example VII

The procedure of Example V was repeated utilizing the same materials in the same quantities except that 85 parts by weight of Resin A were utilized and 15 parts by weight of Resin B of Example V were utilized.

*Example VIII*

The procedure of Example I was repeated utilizing the same materials in the same quantities except that Resin B constituted a copolymer consisting of 90% by weight of vinylidene chloride, about 4.0% by weight of decyl methacrylate, about 5.5 to 6.0% by weight of octyl methacrylate and about 0 to 0.5% by weight of hexyl methacrylate.

*Example IX*

The procedure of Example VIII was repeated utilizing the same materials in the same quantities except that 80 parts by weight of Resin A were utilized and 20 parts by weight of Resin B of Example VIII were utilized.

*Example X*

The procedure of Example VIII was repeated utilizing the same materials in the same quantities except that 85 parts by weight of Resin A were utilized and 15 parts by weight of Resin B of Example VIII were utilized.

*Example XI*

A sheet of 300 gauge regenerated cellulose film (i.e., weighing about 30 g./square meter) containing as an anchoring agent about 0.15% by weight of a partially polymerized precondensate of melamine and formaldehyde was coated with a moisture-proofing coating having the following constitution in parts by weight:

| | |
|---|---|
| Resin A [1] | 90.00 |
| Resin B [2] | 10.00 |
| Hydrogenated castor oil | 2.7 |
| Clay dispersion | 0.9 |
| Alkyd resin [3] | 0.25 |
| Microcrystalline hydrocarbon wax | 0.25 |

[1] Resin A—Copolymer consisting of 90% by weight of vinylidene chloride and 10% by weight of acrylonitrile.
[2] Resin B—Copolymer consisting of 85% by weight of vinylidene chloride and 15% by weight of 2-ethylhexyl acrylate.
[3] Alkyd resin—Castor oil phthalate-adipic acid-diethylene glycol copolyester—used as release agent.

Solvent—65% by weight of tetrahydrofuran and 35% by weight toluene.
Solvent solids—17.5% by weight.

A typical coating run is as follows:

| | |
|---|---|
| Coater and dryer speed | 300 feet/minute. |
| Drier temperature | 240° F. |
| Humidifier temperature, dry bulb/wet bulb | 210°/200° F. |
| Coating weight | 4.93–4.48 g./square meter. |
| Haze | 3.6%. |
| Moisture vapor transmission ratio | 18 g./square meter. |
| Moisture content | 6.5% by weight. |
| Initial sealing temperature | 200° F. |
| V-tears | None. |
| Blocking | None. |

*Example XII*

A blend of 90 parts of Resin A of Example XI and 10 parts of Resin B of Example XI was prepared. This blend, Resin A and Resin B individually were dissolved in tetrahydrofuran-toluene to form coating lacquers. The lacquers were used to coat both anchored and unanchored regenerated cellulose film having a thickness of 0.9 mil. Typical properties of these coated films are given in the following table.

TABLE 1

| | Blend | Resin A | Resin B |
|---|---|---|---|
| W.V.T.R. g./m.²/24 hrs. at 95 rel. hum. 100°/F | 7.2 | 7.5 | 29.5 |
| Blocking | Slight | Bad | None |
| Heat Seal (unanchored) | 125 | 70 | |
| Heat Seal (anchored) | 760 | 660 | 600 |
| Appearance | Clear | Clear | ([1]) |
| Initial Sealing Temp. ° F | 190–194 | 164–168 | 184–188 |

[1] Faint-Bluish-White.

The blend of copolymers of this invention has good wax compatibility. Hence, they afford the advantage of being able to incorporate appreciable quantities of wax for moistureproofing without impairing the clarity of the resulting films.

*Example XIII*

The procedure of Example IX was followed except that 100 parts by weight of Resin A with no Resin B was used.

*Example XIV*

The procedure of Example IX was followed except that 10 parts by weight of a resinous copolymer of 85% vinylidene chloride and 15% ethyl acrylate was substituted for Resin B.

*Example XV*

The procedure of Example IX was followed except that 10 parts by weight of a resinous copolymer of 85% vinylidene chloride and 15% butyl acrylate was substituted for Resin B.

*Example XVI*

The procedure of Example IX was repeated and the coated films of Examples XIII–XVI were subjected to simultaneous testing to produce the following comparative data.

TABLE 2

| | Examples | | | |
|---|---|---|---|---|
| | XIII | XIV | XV | XVI |
| Initial heat seal temperature range, ° F | 184–188 | 184–188 | 176–180 | 200–205 |
| V-Tear temperature, ° F | 240 | 270 | >350 | >350 |
| Heat seal strength— | | | | |
| At 250° F., 0.5 sec | 319 | 365 | 246 | 358 |
| At 300° F., 0.5 sec | 364 | 266 | 289 | 329 |

From the above data it can be seen that the resin blend of the invention produces excellent coating properties in all tested respects. An increase in heat seal temperature range of a minimum of 12° F. is critical for the purpose of reducing blocking tendencies in commercial packaging operations. The temperature at which V-tears appear are greatly improved with the composite sheet of the invention indicating softer, less brittle seals. Further, high heat seal strength at both the higher and lower seal temperatures provides a more commercially desirable packaging material.

Various changes and modifications may be made practicing the invention without departing from the spirit and scope thereof and, therefore, the invention is not to be limited except as defined in the appended claims.

We claim:
1. A moistureproof, composite packaging material comprising a hydrophilic, polysaccharide base sheet, and a smooth, non-particulate coating uniformly covering at least one side of said base sheet comprising a homogeneous blend of from about 50 to 95% by weight of the blend of a copolymer of 80 to 94% by weight of vinylidene chloride and from 20 to 6% of a monomer selected from the group consisting of acrylonitrile, $C_1$–$C_6$ alkyl acrylates,

$C_1$–$C_6$ alkyl methacrylates, acrylic acid and methacrylic acid, and about 50 to 5% by weight of the blend of a copolymer of from 78 to 90% by weight of vinylidene chloride and from 22 to 10% by weight of a monomer selected from the group consisting of $C_8$–$C_{16}$ alkyl acrylates, $C_8$–$C_{16}$ alkyl methacrylates and mixtures thereof.

2. A moistureproof, composite packaging material comprising a hydrophilic, non-fibrous cellulosic base sheet, and a smooth, non-particulate coating uniformly covering at least one side of said base sheet comprising a homogeneous blend of about 83 to 92% by weight of the blend of a copolymer of 85 to 92% by weight of vinylidene chloride and 15 to 8% by weight of a monomer selected from the group consisting of acrylonitrile, $C_1$–$C_6$ alkyl acrylates, $C_1$–$C_6$ alkyl methacrylates, acrylic acid and methacrylic acid, and about 17 to 8% by weight of the blend of a copolymer of 80 to 90% by weight of vinylidene chloride and 20 to 10% by weight of a monomer selected from the group consisting of $C_8$–$C_{16}$ alkyl methacrylates and mixtures thereof.

3. The moistureproof packaging material of claim 2 wherein the base is regenerated cellulose.

4. A moistureproof, composite packaging material comprising a regenerated cellulose film, and a smooth, non-particulate coating uniformly covering at least one side of said film comprising a homogeneous blend of from about 83 to 92% by weight of the blend of a copolymer containing 85 to 92% by weight of vinylidene chloride and 15 to 8% by weight of acrylonitrile, and about 17 to 8% by weight of the blend of a copolymer of from 80 to 90% by weight of vinylidene chloride and from 20 to 10% by weight of a mixture of octyl and decyl methacrylates.

5. A moistureproof, composite packaging material comprising a regenerated cellulose film, and a smooth, non-particulate coating uniformly covering at least one side of said film comprising a homogeneous blend of from about 83 to 92% by weight of the blend of a copolymer of 85 to 92% by weight of vinylidene chloride and 15 to 8% by weight of acrylonitrile, and about 17 to 8% by weight of the blend of a copolymer of 80 to 90% by weight of vinylidene chloride and 20 to 10% by weight of 2-ethylhexyl acrylate.

References Cited

UNITED STATES PATENTS

| | | | |
|---|---|---|---|
| 2,160,945 | 6/1939 | Wiley | 264—184 X |
| 2,334,236 | 11/1943 | Arnold et al. | 117—145 |
| 2,636,870 | 4/1953 | Connors et al. | 260—45.5 |
| 2,637,698 | 5/1953 | Tutwiler | 252—56 |
| 2,748,027 | 5/1956 | Meier | 117—145 X |
| 2,819,984 | 1/1958 | Ackerman | 117—145 X |
| 2,909,449 | 10/1959 | Banigan | 117—145 |
| 2,910,385 | 10/1959 | Berry et al. | 117—145 |
| 2,990,391 | 6/1961 | Grantham | 117—145 X |
| 3,034,929 | 5/1962 | Koch | 117—145 |
| 3,057,752 | 10/1962 | Covington et al. | 117—138.8 |
| 3,251,817 | 5/1966 | Hahn et al. | 117—145 X |

WILLIAM D. MARTIN, *Primary Examiner.*

M. LUSIGNAN, *Assistant Examiner.*